(12) United States Patent
Lim et al.

(10) Patent No.: US 12,137,171 B2
(45) Date of Patent: Nov. 5, 2024

(54) SYSTEM AND METHOD FOR PROVIDING DSSAD DATA

(71) Applicants: Hyundai Motor Company, Seoul (KR); Kia Corporation, Seoul (KR); Hyundai Autoever Corp., Seoul (KR)

(72) Inventors: Hong Yeol Lim, Incheon (KR); Bong Ju Kim, Yongin-si (KR)

(73) Assignees: Hyundai Motor Company, Seoul (KR); Kia Corporation, Seoul (KR); Hyundai Autoever Corp., Seoul (KR)

( * ) Notice: Subject to any disclaimer, the term of this patent is extended or adjusted under 35 U.S.C. 154(b) by 204 days.

(21) Appl. No.: 18/063,163

(22) Filed: Dec. 8, 2022

(65) Prior Publication Data

US 2024/0007297 A1 Jan. 4, 2024

(30) Foreign Application Priority Data

Jul. 4, 2022 (KR) ........................ 10-2022-0081940

(51) Int. Cl.
- *H04L 9/32* (2006.01)
- *B60W 60/00* (2020.01)
- *H04L 9/08* (2006.01)

(52) U.S. Cl.
CPC ......... *H04L 9/3242* (2013.01); *B60W 60/001* (2020.02); *H04L 9/0894* (2013.01)

(58) Field of Classification Search
CPC ... H04L 9/3242; H04L 9/0894; H04L 9/0825; H04L 9/0866; H04L 9/40; H04L 63/123; H04L 2209/84; H04L 9/3231; H04L 9/3234; H04L 9/3066; H04L 63/0428; B60W 60/001; G06F 21/64; G07C 5/02
See application file for complete search history.

(56) References Cited

U.S. PATENT DOCUMENTS

| | | |
|---|---|---|
| 8,903,587 B2 | 12/2014 | Hattori |
| 2012/0101660 A1 | 4/2012 | Hattori |
| 2019/0333289 A1 | 10/2019 | Bayley |

FOREIGN PATENT DOCUMENTS

| | | |
|---|---|---|
| JP | 2012108868 A | 6/2012 |
| KR | 20050121060 A | 12/2005 |
| KR | 101157864 B1 | 6/2012 |
| KR | 20210084760 A | 7/2021 |
| KR | 102334775 B1 | 12/2021 |
| KR | 102336017 B1 | 12/2021 |
| KR | 20220004298 A | 1/2022 |

*Primary Examiner* — Brian Whipple
(74) *Attorney, Agent, or Firm* — Slater Matsil, LLP

(57) ABSTRACT

An embodiment method of providing data storage system for autonomous driving (DSSAD) data by an autonomous driving controller includes verifying a head unit based on a first secret key verification message, verifying a user terminal based on a second secret key verification message, and transmitting the DSSAD data to the user terminal when both the head unit and the user terminal are verified.

20 Claims, 9 Drawing Sheets

SYSTEM AND METHOD FOR PROVIDING DSSAD DATA

CROSS-REFERENCE TO RELATED APPLICATIONS

This application claims the benefit of Korean Patent Application No. 10-2022-0081940, filed on Jul. 4, 2022, which application is hereby incorporated herein by reference.

TECHNICAL FIELD

The present disclosure relates to a technology for providing data storage system for autonomous driving (DSSAD) data.

BACKGROUND

In general, a vehicle security technology is classified into an integrity protection technology of firmware, an access protection technology, a data protection technology, and a network protection technology. In this case, a technology such as 'SecureFlash', 'SecureBoot', or the like is applied to protect the integrity of the firmware, a technology such as 'SeedKey' is applied to protect access, a technology such as full disk encryption (FDE), file based encryption (FBE), or the like is applied to protect user data, and a technology such as 'Firewall', 'Intrusion Detection System', or the like is applied to protect a network.

Recently, as a data protection technology, there is an increasing demand for a technology for protecting data (hereinafter, DSSAD data) stored by a data storage system for autonomous driving (DSSAD) provided in an autonomous vehicle. In this case, the DSSAD stores related data to confirm which object (autonomous driving controller or driver) controls the vehicle just before, during, and immediately after the collision. The DSSAD has a function of recording data and a function of authenticating to transmit data to a specific mechanic, and particularly, uses a replay protected memory block (RPMB) in an embedded multimedia controller (eMMC) in order to ensure the recording of DSSAD data and the integrity of the stored DSSAD data.

Accordingly, research and development to increase the storage period of DSSAD data has been conducted centered on original equipment manufacturer (OEM) companies in developed countries such as Europe, and accordingly, the possibility of changing DSSAD-related standards is increased. When the DSSAD-related standards are changed in the future, it is not possible to secure sufficient storage space only with RPMB in eMMC, so that a preemptive response is required for manufacturers of autonomous driving controllers.

Meanwhile, because the DSSAD provides DSSAD data only to a specified diagnostic device or a specific device of the manufacturer, in the event of a traffic accident or violation of road traffic laws, it is difficult for the driver (user or vehicle owner) to view the DSSAD data in a situation where it is necessary to determine who is responsible, i.e., whether it is the driver's fault or the fault of the autonomous driving controller.

The matters described in this background section are intended to promote an understanding of the background of embodiments of the disclosure and may include matters that are not already known to those of ordinary skill in the art.

SUMMARY

The present disclosure relates to a technology for providing data storage system for autonomous driving (DSSAD) data. Particular embodiments relate to a technology for providing DSSAD data to a user terminal while maintaining confidentiality and integrity of the DSSAD data.

Embodiments of the present disclosure can solve problems occurring in the prior art while advantages achieved by the prior art are maintained intact.

An embodiment of the present disclosure provides a mechanism for storing DSSAD data in an external memory (e.g., a SD memory) space to improve the capacity of RPMB in eMMC, a mechanism for authenticating a driver to ensure confidentiality, and a mechanism for combining one-pass elliptic curve Diffie-Hellman (ECDH) and a message authentication code (MAC), thereby improving the storage space issue of DSSAD data and the issue of acquiring DSSAD data.

Another embodiment of the present disclosure provides a system for providing DSSAD data and a method thereof that can authenticate a user by interworking with a head unit provided in a vehicle, verify the head unit based on a first secret key verification message, verify a user terminal based on a second private key verification message, and transmit the DSSAD data to the user terminal when both the head unit and the user terminal are verified, thereby providing the DSSAD data to the user while maintaining the integrity and confidentiality of data.

The technical features of embodiments of the present disclosure are not limited to the above-mentioned features, and other unmentioned technical features and advantages will become apparent from the following description. Also, it may be easily understood that the features and advantages of embodiments of the present disclosure may be realized by the units and combinations thereof recited in the claims.

According to an embodiment of the present disclosure, a method of providing data storage system for autonomous driving (DSSAD) data includes verifying, by an autonomous driving controller, a head unit based on a first secret key verification message, verifying, by the autonomous driving controller, a user terminal based on a second secret key verification message, and transmitting, by the autonomous driving controller, the DSSAD data to the user terminal when both the head unit and the user terminal are verified.

According to an embodiment, the transmitting of the DSSAD data to the user terminal may include converting, by the autonomous driving controller, the DSSAD data into an extensible markup language (XML) file and encrypting the XML file by the autonomous driving controller.

According to an embodiment, the verifying of the head unit may include first verifying, by the autonomous driving controller, the head unit through a comparison between a message authentication code (MAC) received from the head unit and a MAC generated by the autonomous driving controller, and finally verifying, by the autonomous driving controller, the head unit based on a verification result recorded in the first secret key verification message.

According to an embodiment, the first verifying of the head unit may include receiving, by the autonomous driving controller, the first secret key verification message from the head unit, calculating, by the autonomous driving controller, a hash value of the first secret key verification message, receiving, by the autonomous driving controller, a first secret key from the head unit, generating, by the autonomous driving controller, the MAC by encrypting the hash value with the first secret key, and receiving, by the autonomous driving controller, the MAC from the head unit.

According to an embodiment, the receiving of the first secret key from the head unit may include generating, by the autonomous driving controller, a public key and a private key based on elliptic curve cryptography (ECC), transmitting, by the autonomous driving controller, the public key to the head unit, receiving, by the autonomous driving controller, an encrypted first secret key from the head unit, and decrypting, by the autonomous driving controller, the encrypted first secret key with the private key.

According to an embodiment, the receiving of the MAC from the head unit may include generating, by the head unit, the first secret key, generating, by the head unit, the first secret key verification message, calculating, by the head unit, the hash value of the first secret key verification message, generating, by the head unit, the MAC by encrypting the hash value with the first secret key, and transmitting, by the head unit, the MAC to the autonomous driving controller.

According to an embodiment, the generating of the first secret key by the head unit may include recognizing, by the head unit, a fingerprint of a user, and generating, by the head unit, the first secret key by using fingerprint data of the user.

According to an embodiment, the final verifying of the head unit may include determining, by the autonomous driving controller, that the head unit is normal when the verification result recorded in the first secret key verification message is 'Pass', and determining, by the autonomous driving controller, that the head unit is abnormal when the verification result recorded in the first secret key verification message is 'Fail'.

According to an embodiment, the determining of the head unit as abnormal may include identifying, by the autonomous driving controller, whether the first secret key includes more than a preset number of consecutive zeros when the verification result recorded in the first secret key verification message is 'Fail', determining, by the autonomous driving controller, that the head unit is finally abnormal when the first secret key includes more than the preset number of consecutive zeros as an identifying result, and determining, by the autonomous driving controller, that the head unit is finally normal when the first secret key does not include more than the preset number of consecutive zeros as the identifying result.

According to an embodiment, the verifying of the user terminal may include first verifying, by the autonomous driving controller, the user terminal through a comparison between a MAC received from the user terminal and a MAC generated by the autonomous driving controller, and finally verifying, by the autonomous driving controller, the user terminal based on a verification result recorded in the second secret key verification message.

According to an embodiment, the first verifying of the user terminal may include receiving, by the autonomous driving controller, the second secret key verification message from the user terminal, calculating, by the autonomous driving controller, a hash value of the second secret key verification message, receiving, by the autonomous driving controller, a second secret key from the user terminal, generating, by the autonomous driving controller, the MAC by encrypting the hash value with the second secret key, and receiving, by the autonomous driving controller, the MAC from the user terminal.

According to an embodiment, the receiving of the second secret key from the user terminal may include generating, by the autonomous driving controller, a public key and a private key based on ECC, transmitting, by the autonomous driving controller, the public key to the user terminal, receiving, by the autonomous driving controller, an encrypted second secret key from the user terminal, and decrypting, by the autonomous driving controller, the encrypted second secret key with the private key.

According to an embodiment, the receiving of the MAC from the user terminal may include generating, by the user terminal, the second secret key, generating, by the user terminal, the second secret key verification message, calculating, by the user terminal, a hash value of the second secret key verification message, generating, by the user terminal, the MAC by encrypting the hash value with the second secret key, and transmitting, by the user terminal, the MAC to the autonomous driving controller.

According to an embodiment, the final verifying of the user terminal may include determining, by the autonomous driving controller, that the user terminal is normal when the verification result recorded in the second secret key verification message is 'Pass', and determining, by the autonomous driving controller, that the user terminal is abnormal when the verification result recorded in the second secret key verification message is 'Fail'.

According to an embodiment, the determining of the user terminal as abnormal may include identifying, by the autonomous driving controller, whether the second secret key includes more than a preset number of consecutive zeros when the verification result recorded in the second secret key verification message is 'Fail', determining, by the autonomous driving controller, that the user terminal is finally abnormal when the second secret key includes more than the preset number of consecutive zeros as an identifying result, and determining, by the autonomous driving controller, that the user terminal is finally normal when the second secret key does not include more than the preset number of consecutive zeros as the identifying result.

According to an embodiment of the present disclosure, a system for providing data storage system for autonomous driving (DSSAD) data includes a head unit configured to generate a first secret key verification message, a user terminal configured to generate a second secret key verification message, and an autonomous driving controller configured to verify the head unit based on the first secret key verification message, verify the user terminal based on the second secret key verification message, and transmit the DSSAD data to the user terminal when the head unit and the user terminal are verified.

According to an embodiment, the autonomous driving controller may convert the DSSAD data into an extensible markup language (XML) file, encrypt the XML file, and transmit the encrypted XML file to the user terminal.

According to an embodiment, the autonomous driving controller may first verify the head unit through a comparison between a first message authentication code (MAC) received from the head unit and a first MAC generated by the autonomous driving controller, finally verify the head unit based on a verification result recorded in the first secret key verification message, first verify the user terminal through a comparison between a second MAC received from the user terminal and a second MAC generated by the autonomous driving controller, and finally verify the user terminal based on a verification result recorded in the second secret key verification message.

According to an embodiment, the autonomous driving controller may determine that the head unit is normal when the verification result recorded in the first secret key verification message is 'Pass', determine that the head unit is abnormal when the verification result recorded in the first secret key verification message is 'Fail', determine that the user terminal is normal when the verification result recorded in the second secret key verification message is 'Pass', and determine that the user terminal is abnormal when the verification result recorded in the second secret key verification message is 'Fail'.

According to an embodiment, the autonomous driving controller may determine that the head unit is finally abnormal when the verification result recorded in the first secret key verification message is 'Fail' and the first secret key received from the head unit includes more than a preset number of consecutive zeros, and may determine that the head unit is finally normal when the first secret key does not include more than the preset number of consecutive zeros, wherein the autonomous driving controller is configured to determine that the user terminal is finally abnormal when the verification result recorded in the second secret key verification message is 'Fail' and the second secret key received from the user terminal includes more than the preset number of consecutive zeros, and determine that the user terminal is finally normal when the second secret key does not include more than the preset number of consecutive zeros.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
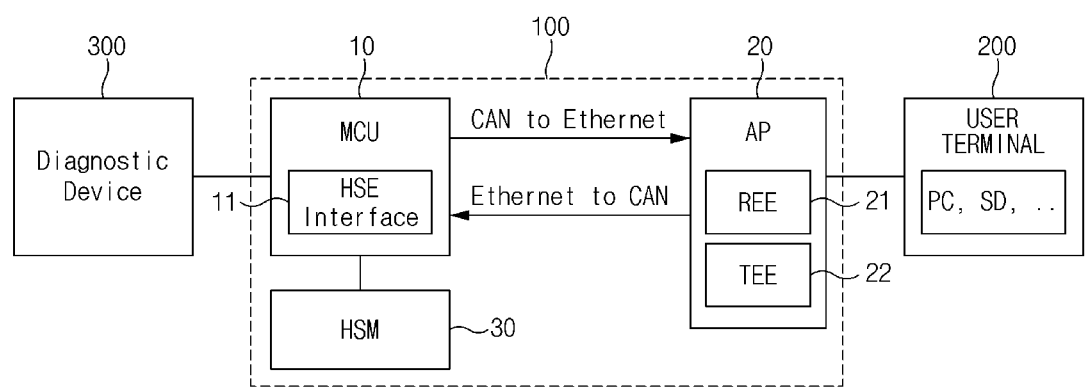
FIG. 1 is a block diagram illustrating an architecture of a system for providing DSSAD data according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an architecture of a system for providing DSSAD data according to an embodiment of the present disclosure.

As shown in FIG. 1, a system for providing DSSAD data according to an embodiment of the present disclosure may include an autonomous driving controller 100, a user terminal 200, and a diagnostic device 300. In this case, the autonomous driving controller 100 may include a micro control unit (MCU) 10, an application processor (AP) 20, and a hardware security module (HSM) 30.

The autonomous driving controller 100 may perform overall control in relation to autonomous driving, and may be implemented in the form of hardware or software, or may be implemented in a combination of hardware and software.

Regarding each component, the MCU 10 uses the HSM 30 to ensure confidentiality and integrity for DSSAD data. In this case, the MCU 10 may include a hardware security engine (HSE) interface 11 to interwork with an HSE provided in the HSM 30. The AP 20 uses a rich execution environment (REE) 21 and a trusted execution environment (TEE) 22. In this case, the HSM 30 has an interface implemented through a crypto service manager (CSM) module, which is an AUTOSAR standard, and the TEE 22 has an interface according to the global platform (GP) standard. In this case, when the AP 20 that provides an open portable TEE (OP-TEE) according to the GP standard is used, the development period may be shortened.

The MCU 10 may verify the diagnostic device 300 and transmit DSSAD data to the diagnostic device 300 for which verification is normally completed. In more detail, the diagnostic device 300 requests a seed from the MCU 10, generates a key based on the seed received from the MCU 10, and then transmits the key to the MCU 10. When the MCU 10 receives a seed request from the diagnostic device 300, the MCU 10 generates a seed by using the HSE of the HSM 30 and transmits the seed to the diagnostic device 300. In addition, the MCU 10 generates a seed-based key based on the same encryption algorithm as that of the diagnostic device 300. Thereafter, when the key received from the diagnostic device 300 and the key generated by the MCU 10 are the same, the MCU 10 transmits the DSSAD data to the diagnostic device 300.

The AP 20 may transmit the DSSAD data to the wirelessly connected user terminal 200. To this end, it is possible to exchange each supported algorithm and version, verify whether the counter party is a trusted object (PKI process), and exchange a symmetric key for encrypting the DSSAD data.

The AP 20 may transmit the DSSAD data to the user terminal 200 connected by wire. In this case, the AP 20 may convert the DSSAD data into an extensible markup language (XML) file and encrypt the XML file in a full disk encryption (FDE) scheme or a file based encryption (FBE) scheme.

Figure 2:
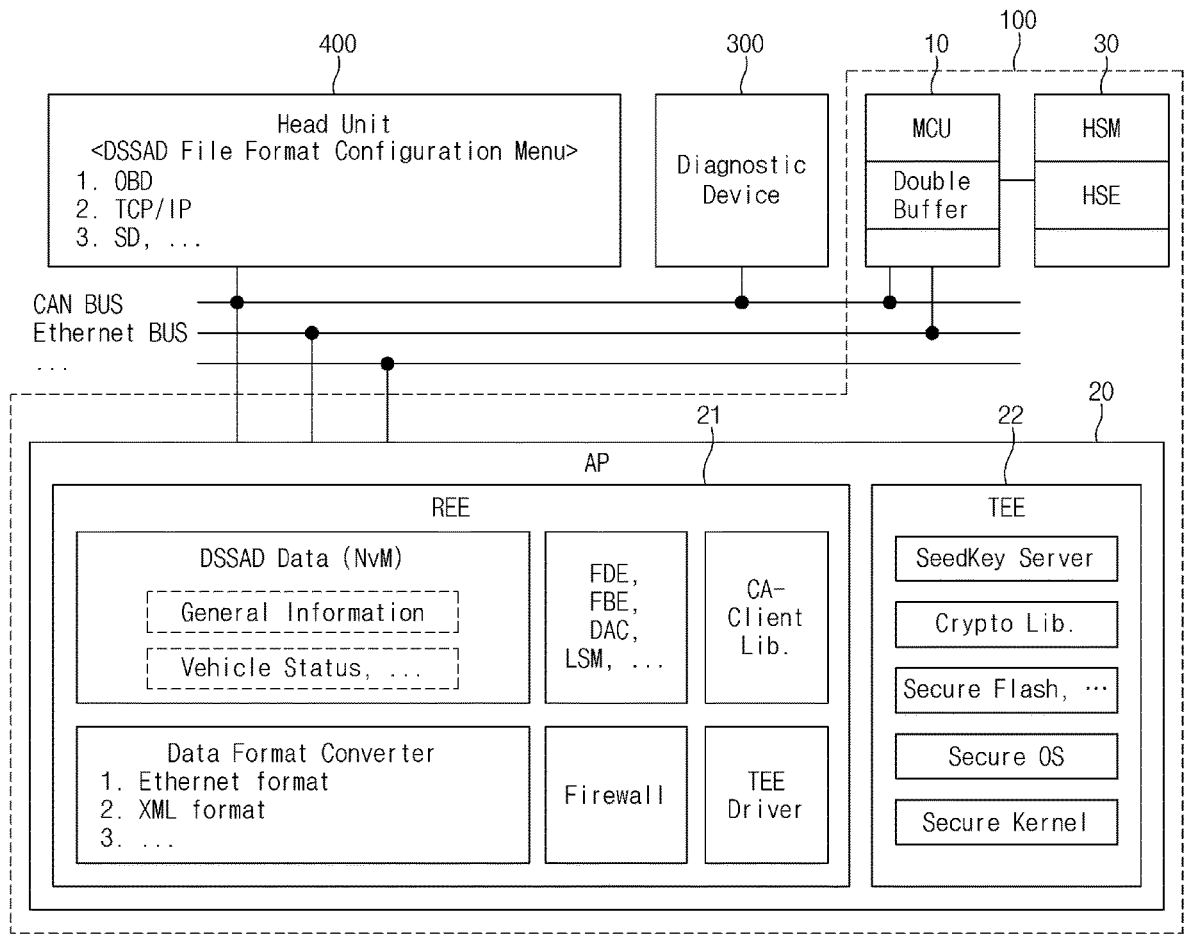
FIG. 2 is a block diagram illustrating a detailed architecture of a system for providing DSSAD data according to an embodiment of the present disclosure.

FIG. 2 is a block diagram illustrating a detailed architecture of a system for providing DSSAD data according to an embodiment of the present disclosure.

As shown in FIG. 2, a head unit 400 may provide an OBD access scheme, a TCP/IP access scheme, and an SD memory access scheme as an access scheme to DSSAD data. That is, the user may select an access scheme to DSSAD data through the head unit 400. In this case, the on-board diagnostics (OBD) access scheme may be applied when the user requests DSSAD data by using the diagnostic device 300. The TCP/IP access scheme may be applied to the wirelessly connected user terminal 200. The secure digital (SD) memory access scheme may be applied to the user terminal 200 connected by wire.

For example, when the user selects the OBD access scheme in the head unit 400, the MCU 10 may transmit DSSAD data to the diagnostic device 300 by using a unified diagnostic services (UDS) protocol. In this case, the MCU 10 may perform integrity verification on the diagnostic device 300 according to a secure access procedure of the UDS protocol. Of course, the MCU 10 may use a seed key algorithm or a certificate-based security algorithm.

As another example, when the user selects the SD memory access scheme in the head unit 400, the AP 20 may convert the DSSAD data stored in a non-volatile memory (NvM) into an XML file, encrypt the XML file in the FDE or FBE scheme, and store the encrypted XML file in the SD memory. In this case, the SD memory may be provided with a controller such that data are transmitted and received to/from the autonomous driving controller 100, and various functions (secret key generation, hash value calculation, encryption, and the like) may be performed in the verification process.

For reference, the head unit 400, which is a device mounted on the dashboard (center fascia) of a vehicle, may be provided with a human-machine interface (HMI) to communicate with the autonomous driving controller 100.

Figure 3:
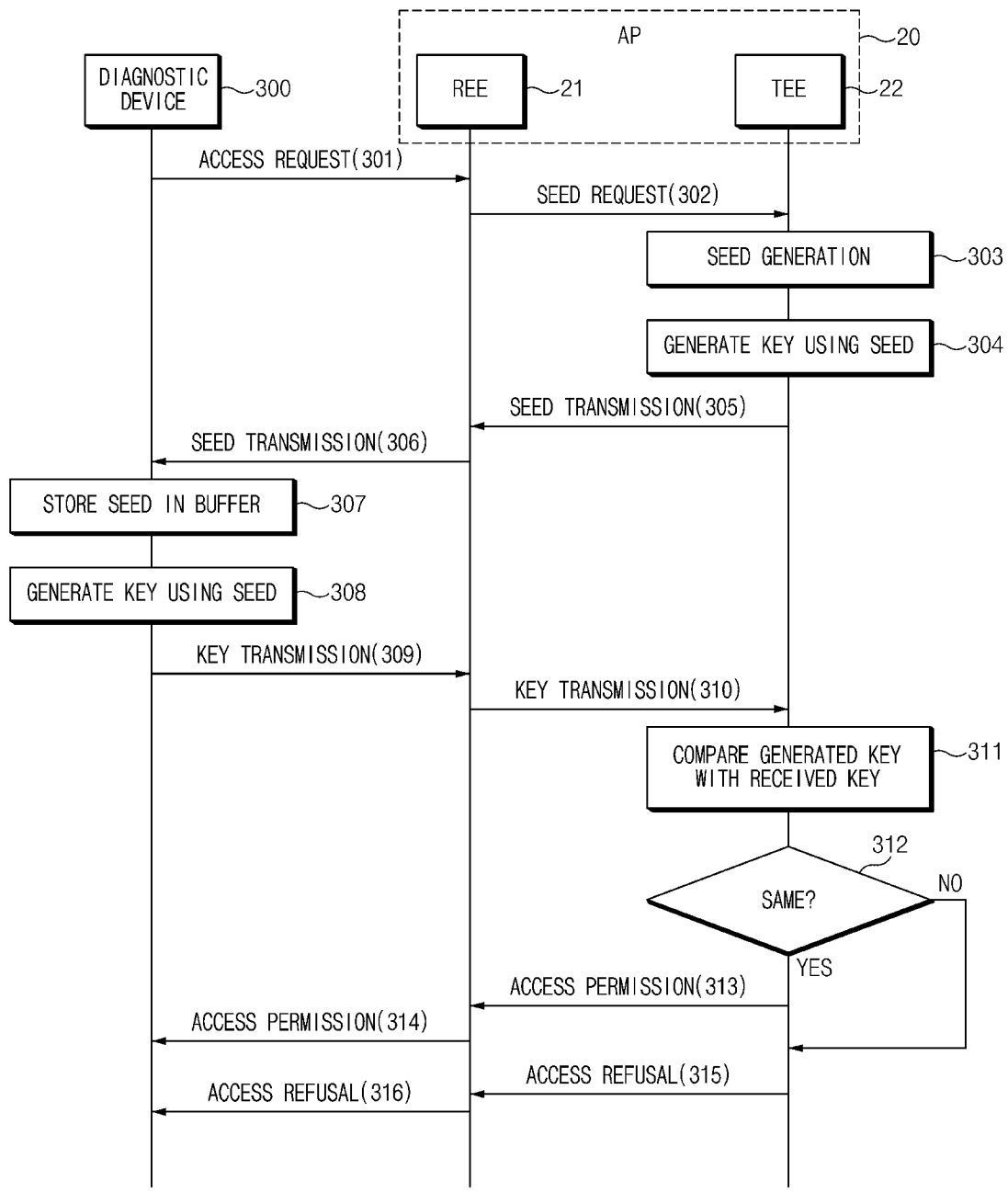
FIG. 3 is a diagram illustrating a secure access procedure between an autonomous driving controller and a diagnostic device according to an embodiment of the present disclosure.

FIG. 3 is a diagram illustrating a secure access procedure between an autonomous driving controller and a diagnostic device according to an embodiment of the present disclosure.

In 301, the diagnostic device 300 requests a secure access from the REE 21 of the AP 20 in the autonomous driving controller.

In 302, the REE 21 requests a seed from the TEE 22.

In 303, the TEE 22 generates a seed.

In 304, the TEE 22 generates a key corresponding to the seed based on a security algorithm. In this case, the TEE 22 may store the generated key in a buffer.

In 305, the TEE 22 transmits the generated seed to the REE 21.

In 306, the REE 21 transmits the seed received from the TEE 22 to the diagnostic device 300.

In 307, the diagnostic device 300 stores the seed received from the REE 21 in a buffer.

In 308, the diagnostic device 300 generates a key corresponding to the seed based on a security algorithm. In this case, the security algorithm stored in the diagnostic device 300 is the same as the security algorithm stored in the TEE 22.

In 309, the diagnostic device 300 transmits the generated key to the REE 21.

In 310, the REE 21 transmits the key received from the diagnostic device 300 to the TEE 22.

In 311, the TEE 22 compares the key generated by the diagnostic device 300 with the key generated by the TEE 22.

In 312 and 313, when the key generated by the TEE 22 and the key generated by the diagnostic device 300 are identical to each other, the TEE 22 transmits the access permission to the REE 21.

In 314, the REE 21 transmits the access permission to the diagnostic device 300.

In 312 and 315, when the key generated by the TEE 22 and the key generated by the diagnostic device 300 are not identical to each other, the TEE 22 transmits the access refusal to the REE 21.

In 316, the REE 21 transmits the access refusal to the diagnostic device 300.

Figure 4:
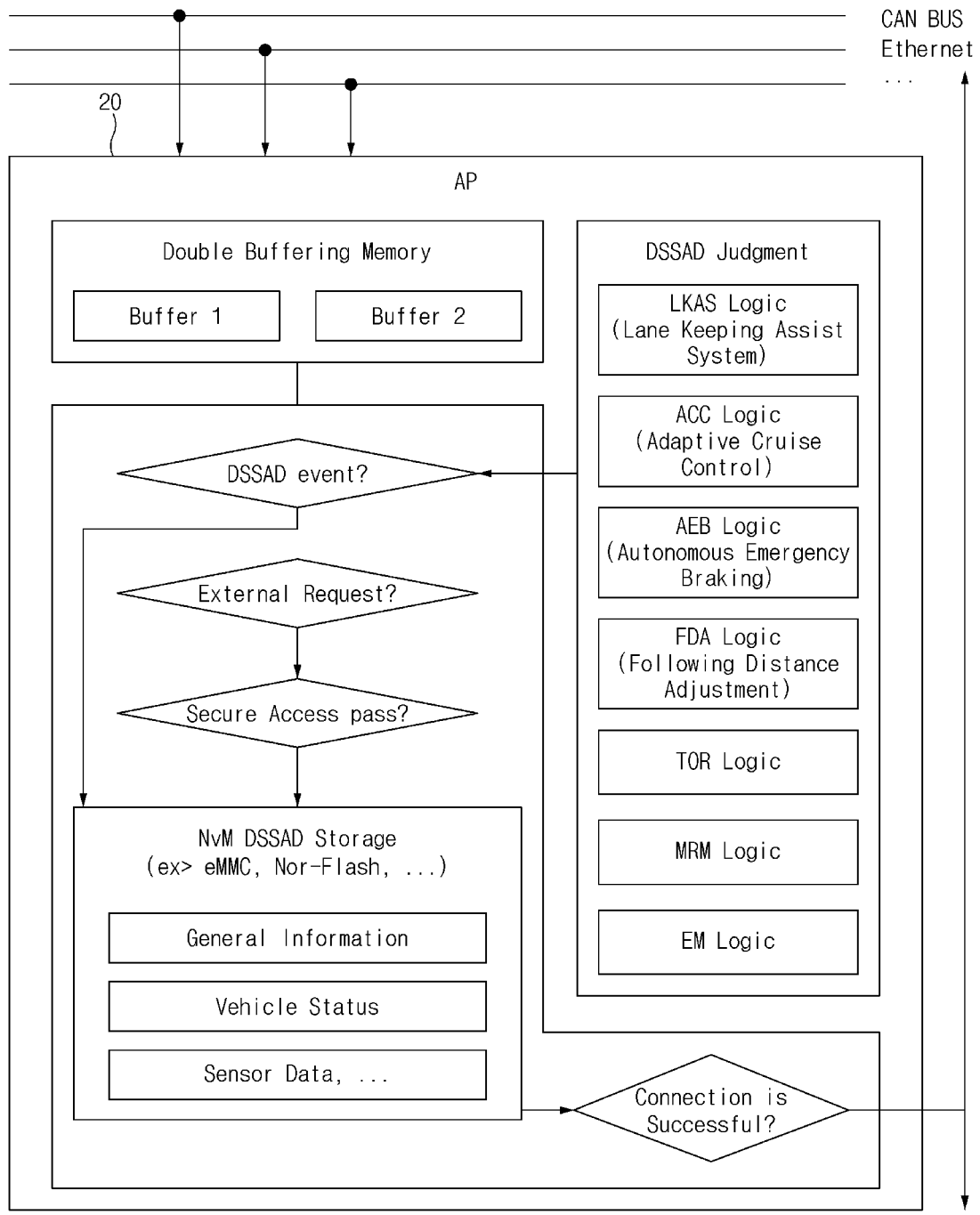
FIG. 4 is a diagram illustrating a DSSAD data collection and transmission architecture of an autonomous driving controller according to an embodiment of the present disclosure.

FIG. 4 is a diagram illustrating a DSSAD data collection and transmission architecture of an autonomous driving controller according to an embodiment of the present disclosure. FIG. 4 illustrates an architecture that provides an online transmission scheme and a local storage scheme for DSSAD data.

As shown in FIG. 4, because the AP 20 is connected to a controller area network (CAN) bus and Ethernet, the AP 20 may transmit the DSSAD data to the user terminal 200 in an online transmission scheme or may store the DSSAD in a personal computer (PC) or a memory or SD memory of a mobile phone in a local storage scheme.

In this case, the online transmission scheme may secure confidentiality and integrity by transport layer security (TLS), and the local storage scheme may use an SD memory, in which some functions of a hardware security module (HSM) are embedded, to secure confidentiality and integrity. In this case, confidentiality guarantee means that data is protected from disclosure, and integrity guarantee means that data is protected from alteration.

The AP 20 may have a double buffering memory, and may have a lane keeping assist system (LKAS) logic, an adaptive cruise control (ACC) logic, an automatic emergency braking (AEB) logic, a following distance adjustment (FDA) logic, a take-over request (TOR) logic, a minimal risk manager (MRM) logic, an emergency manager (EM) logic, and the like for DSSAD data collection.

When an event occurs, the AP 20 may store the DSSAD data in a replay protected memory block (RPMB) in an embedded multi-media controller (eMMC), or a non-volatile memory (NvM) such as NOR flash, and may transmit the DSSAD data stored in the NvM to the diagnostic device, the SD memory, and the like according to a user's request.

Figure 5:
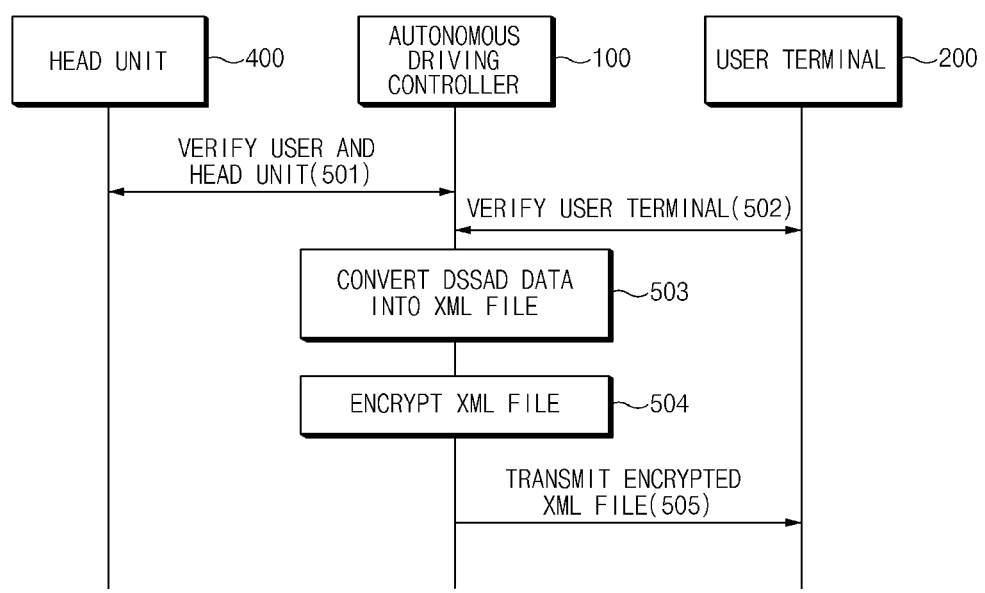
FIG. 5 is a flowchart illustrating a method of providing DSSAD data according to an embodiment of the present disclosure.

FIG. 5 is a flowchart illustrating a method of providing DSSAD data according to an embodiment of the present disclosure.

First, in 501, the autonomous driving controller 100 authenticates a user (vehicle owner) through the head unit, and verifies the head unit 400. The operation of '501' will be described in detail with reference to FIG. 6.

Thereafter, in 502, the autonomous driving controller 100 verifies the user terminal 200 connected by wire. The operation of '502' will be described in detail with reference to FIG. 7.

Thereafter, when the user is authenticated and the head unit 400 and the user terminal are verified, the autonomous driving controller 100 converts the DSSAD data into an XML file in 503.

Thereafter, the autonomous driving controller 100 encrypts the XML file in 504. The operation of '504' will be described in detail with reference to FIG. 8.

Thereafter, the autonomous driving controller 100 transmits the encrypted XML file to the user terminal 200 in 505.

Figure 6:
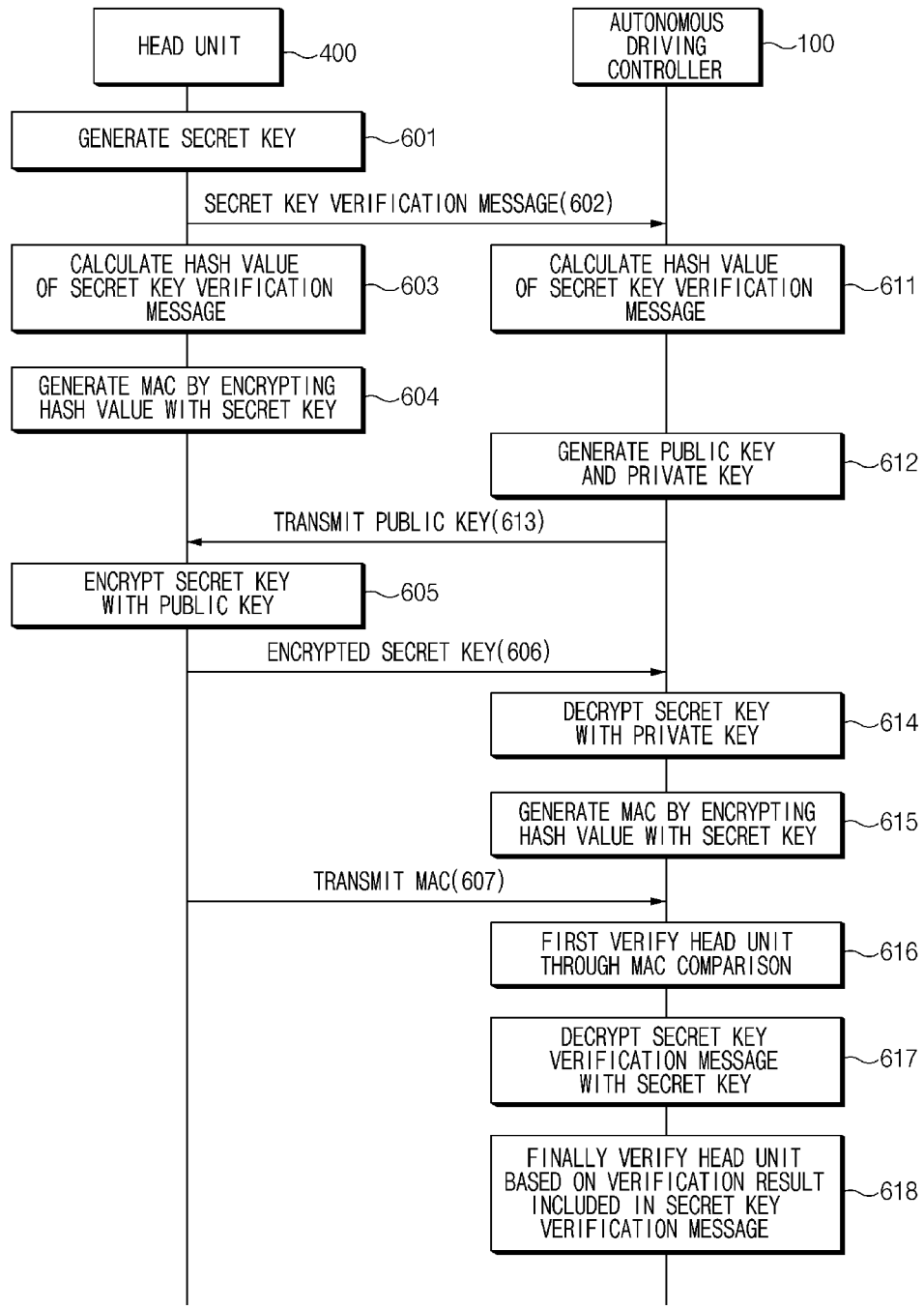
FIG. 6 is a diagram illustrating an operation in which an autonomous driving controller according to an embodiment of the present disclosure verifies a head unit.

FIG. 6 is a diagram illustrating an operation in which an autonomous driving controller according to an embodiment of the present disclosure verifies a head unit. FIG. 6 illustrates the relationship between the autonomous driving controller 100 and the head unit 400.

First, the user may perform an authentication operation through the head unit 400. That is, the head unit 400 may perform authentication through the user's fingerprint recognition and transmit the authentication result to the autonomous driving controller 100. When normally authenticated, the head unit 400 calculates a hash value for the authentication result and then deletes the authentication result.

Thereafter, the head unit 400 generates a secret key in 601. In this case, the secret key may be a temporary secret key, and the head unit 400 may generate a temporary secret key by using fingerprint data used to authenticate the user.

Thereafter, in 602, the head unit 400 generates a secret key verification message including information (Pass or Fail) indicating whether the secret key is normally generated and transmits the secret key verification message to the autonomous driving controller 100. In this case, the head unit 400 may encrypt the secret key verification message with the secret key.

Thereafter, in 603, the head unit 400 calculates a hash value of the secret key verification message.

Thereafter, in 604, the head unit 400 generates a message authentication code (MAC) by encrypting the secret key verification message with the secret key.

Thereafter, in 605, the head unit 400 encrypts the secret key by using the public key received from the autonomous driving controller 100.

Thereafter, in 606, the head unit 400 transmits the encrypted secret key to the autonomous driving controller 100. In this case, the head unit 400 may delete the secret key immediately after transmitting the encrypted secret key to the autonomous driving controller 100.

Then, in 607, the head unit 400 transmits the MAC to the autonomous driving controller 100. In this case, the transmission time of the MAC may be immediately after generation.

Meanwhile, in 611, the autonomous driving controller 100 calculates the hash value of the secret key verification message received from the head unit 400.

Thereafter, the autonomous driving controller 100 generates a public key and a private key in 612. In this case, the autonomous driving controller 100 may generate the public key and the private key based on elliptic curve cryptography (ECC). The private key generated in such a manner may be stored in a space (e.g., a separate memory) isolated in hardware within the autonomous driving controller 100.

Thereafter, in 613, the autonomous driving controller 100 transmits the public key to the head unit 400.

Thereafter, in 614, the autonomous driving controller 100 decrypts the encrypted secret key received from the head unit 400 with the private key.

Thereafter, in 615, the autonomous driving controller 100 generates a MAC by encrypting the hash value with the secret key.

Thereafter, in 616, the autonomous driving controller 100 first verifies the head unit 400 by comparing the MAC generated by the autonomous driving controller 100 with the MAC received from the head unit 400. In this case, when the MAC generated by the autonomous driving controller 100 and the MAC received from the head unit 400 are identical with each other, the autonomous driving controller 100 determines that the head unit 400 is normal.

Thereafter, in 617, the autonomous driving controller 100 decrypts the secret key verification message with the secret key.

Thereafter, in 618, the autonomous driving controller 100 finally verifies the head unit 400 based on the verification result included in the secret key verification message. In this case, when the verification result included in the secret key verification message is 'Pass', the autonomous driving controller 100 determines that the head unit 400 is finally normal. When the verification result included in the secret key verification message is 'Fail', the autonomous driving controller 100 determines that the head unit 400 is finally abnormal.

In addition, when the verification result included in the secret key verification message is 'Fail', the autonomous driving controller 100 may perform verification for 'Fail'. That is, the autonomous driving controller 100 may check whether the secret key includes more than a preset number of consecutive zeros, and in that case, may determine it as 'Fail', otherwise it may determine it as 'Pass'.

Figure 7:
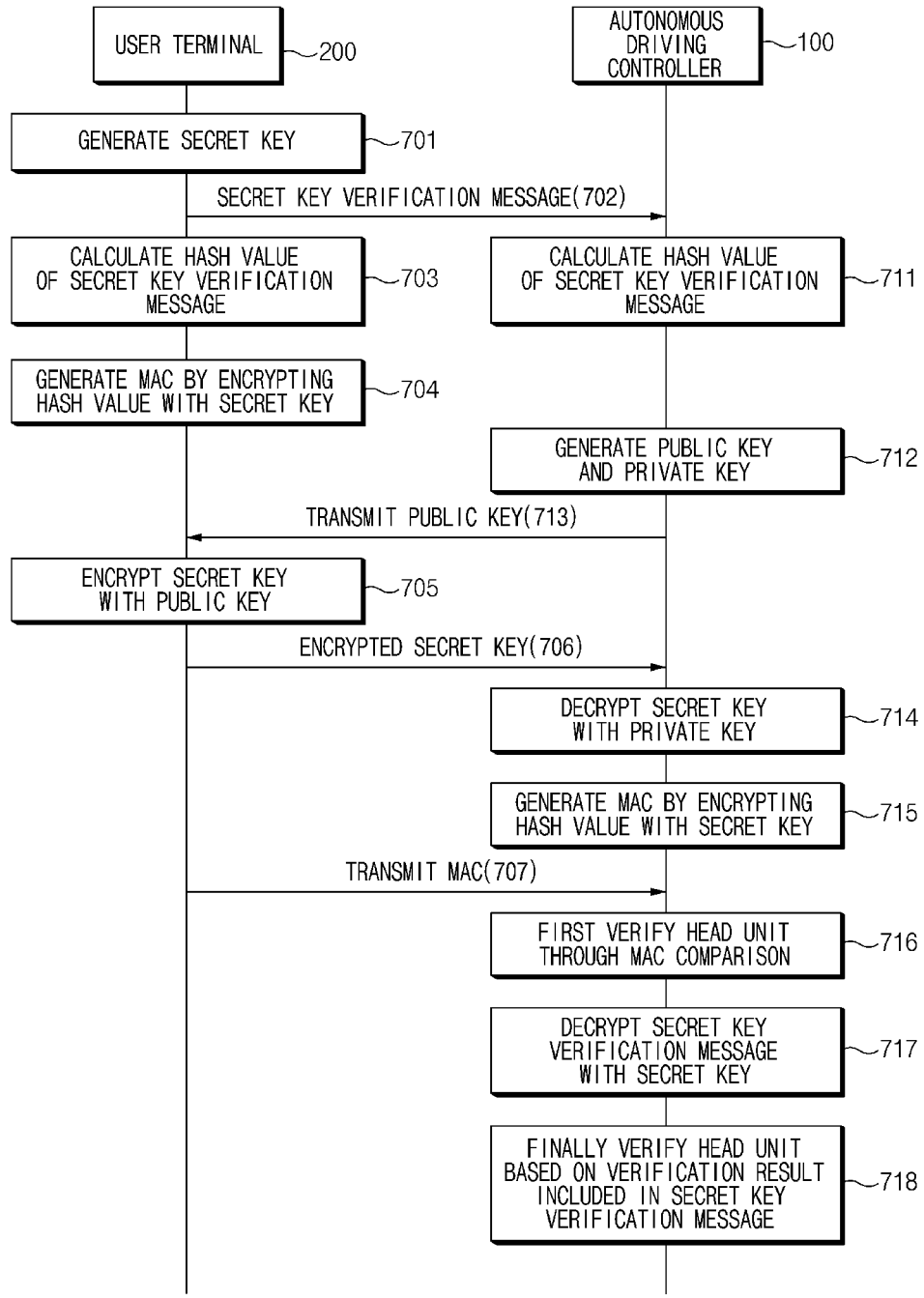
FIG. 7 is a diagram illustrating an operation in which an autonomous driving controller according to an embodiment of the present disclosure verifies a user terminal.

FIG. 7 is a diagram illustrating an operation in which an autonomous driving controller according to an embodiment of the present disclosure verifies a user terminal. FIG. 7 illustrates the relationship between the autonomous driving controller 100 and the user terminal 200. In this case, the user terminal 200 may be an SD memory.

First, in 701, the user terminal 200 generates a secret key. In this case, the secret key may be a temporary secret key.

Thereafter, in 702, the user terminal 200 generates a secret key verification message including information (Pass or Fail) indicating whether the secret key is normally generated and transmits the secret key verification message to the autonomous driving controller 100. In this case, the user terminal 200 may encrypt the secret key verification message with the secret key.

Thereafter, in 703, the user terminal 200 calculates a hash value of the secret key verification message.

Thereafter, in 704, the user terminal 200 generates a message authentication code (MAC) by encrypting the secret key verification message with the secret key.

Thereafter, in 705, the user terminal 200 encrypts the secret key by using the public key received from the autonomous driving controller 100.

Thereafter, in 706, the user terminal 200 transmits the encrypted secret key to the autonomous driving controller 100. In this case, the user terminal 200 may delete the secret key immediately after transmitting the encrypted secret key to the autonomous driving controller 100.

Then, the user terminal 200 transmits the MAC to the autonomous driving controller 100 in 707. In this case, the transmission time of the MAC may be immediately after generation.

Meanwhile, in 711, the autonomous driving controller 100 calculates the hash value of the secret key verification message received from the user terminal 200.

Thereafter, the autonomous driving controller 100 generates a public key and a private key. In this case, the autonomous driving controller 100 may generate the public key and the private key based on elliptic curve cryptography (ECC). The private key generated in this manner may be stored in a space (e.g., a separate memory) isolated in hardware within the autonomous driving controller 100.

Thereafter, in 713, the autonomous driving controller 100 transmits the public key to the user terminal 200.

Thereafter, in 714, the autonomous driving controller 100 decrypts the encrypted secret key received from the user terminal 200 with the private key.

Thereafter, in 715, the autonomous driving controller 100 generates the MAC by encrypting the hash value with the secret key.

Thereafter, in 716, the autonomous driving controller 100 first verifies the user terminal 200 by comparing the MAC generated by the autonomous driving controller 100 and the MAC received from the user terminal 200. In this case, when the MAC generated by the autonomous driving controller 100 and the MAC received from the user terminal 200 are identical with each other, the autonomous driving controller 100 determines that the user terminal 200 is normal.

Thereafter, in 717, the autonomous driving controller 100 decrypts the secret key verification message with the secret key.

Thereafter, in 718, the autonomous driving controller 100 finally verifies the user terminal 200 based on the verification result included in the secret key verification message. In this case, when the verification result included in the secret key verification message is 'Pass', the autonomous driving controller 100 determines that the user terminal 200 is finally normal. When the verification result included in the secret key verification message is 'Fail', the autonomous driving controller 100 determines that the user terminal 200 is finally abnormal.

In addition, when the verification result included in the secret key verification message is 'Fail', the autonomous driving controller 100 may perform verification for 'Fail'. That is, the autonomous driving controller 100 may check whether the secret key includes more than a preset number of consecutive zeros, and in that case, may determine it as 'Fail', otherwise it may determine it as 'Pass'.

Figure 8:
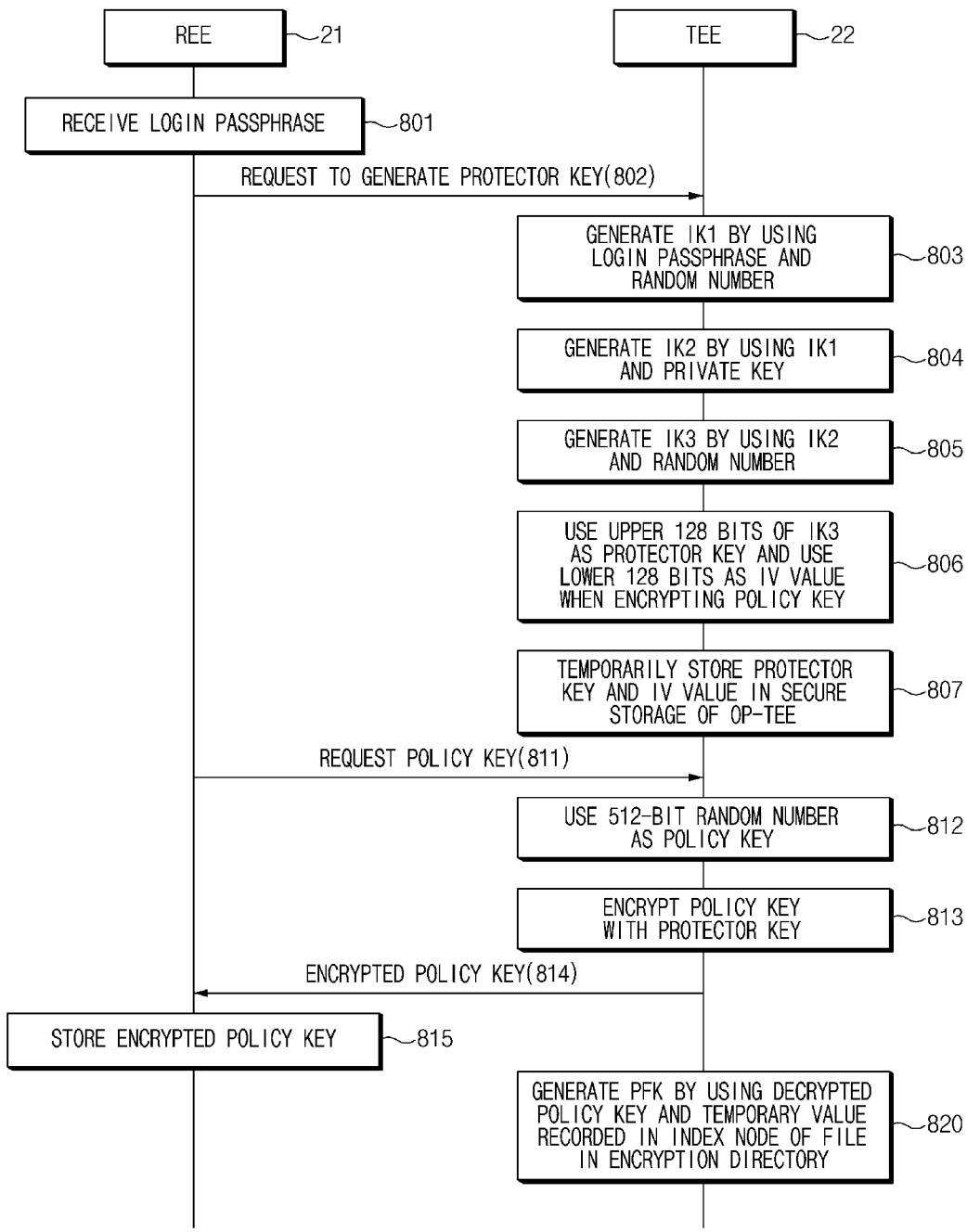
FIG. 8 is a diagram illustrating an operation in which an autonomous driving controller according to an embodiment of the present disclosure generates a PFK used for XML file encryption.

FIG. 8 is a diagram illustrating an operation in which an autonomous driving controller according to an embodiment of the present disclosure generates a PFK used for XML file encryption.

When the authentication procedure for a user (vehicle owner) is normally completed, the autonomous driving controller 100 may change the DSSAD data stored in a non-volatile memory (NvM) to that of the XML file format and encrypt the XML file in a file-based encryption (FBE) scheme. The encrypted XML files may be generated only upon request, and confidentiality may be maintained by the authentication procedure.

The autonomous driving controller 100 may encrypt the XML file by using a per-file key (PFK). In this case, the autonomous driving controller 100 may generate the PFK by using a protector key and a policy key. In this case, the protector key may be used to encrypt and decrypt the policy key. Hereinafter, an operation of generating a PFK will be described.

In 801, the REE 21 receives a login passphrase from the user.

In 802, the REE 21 requests to generate the protector key while transmitting the login passphrase to the TEE 22.

In 803, the TEE 22 generates intermediate key (IK) 1 by using the login passphrase received from the REE 21 and a random number generated by the TEE 22. That is, the TEE 22 inputs the login passphrase received from the REE 21 and the random number generated by the TEE 22 to the crypto module, and the crypto module generates IK1 by using a password-based key derivation function (PBKDF) 2 algorithm.

In 804, the TEE 22 generates IK2 by using IK1 and the private key. That is, the TEE 22 inputs IK1 and a private key of Rivest Shamir Adleman (RSA) 2048-bit to the crypto module, and the crypto module generates IK2 by using an RSA digital signature algorithm.

In 805, the TEE 22 generates IK3 by using IK2 and a fixed random number. That is, the TEE 22 inputs IK2 and the fixed random number to the crypto module, and the crypto module generates IK3 by using the PBKDF 2 algorithm.

In 806, the TEE 22 uses the upper 128 bits of IK3 as the protector key and uses the lower 128 bits as an initial vector (IV) value when encrypting the policy key.

In 807, the TEE 22 temporarily stores the protector key and IV value in the secure storage of OP-TEE.

In 811, the REE 21 requests a policy key from the TEE 22.

In 812, the TEE 22 uses a random number of 512 bits as the policy key. In this case, the 512-bit random number may be generated by a random number generator (RNG).

In 813, the TEE 22 encrypts the policy key with the protector key.

In 814, the TEE 22 transmits the encrypted policy key to the REE 21.

In 815, the REE 21 stores the encrypted policy key received from the TEE 22.

In 820, the TEE 22 decrypts the encrypted policy key and generates a PFK by using the decrypted policy key and a temporary value (number used once) recorded in the index node of the file in the encryption directory.

Figure 9:
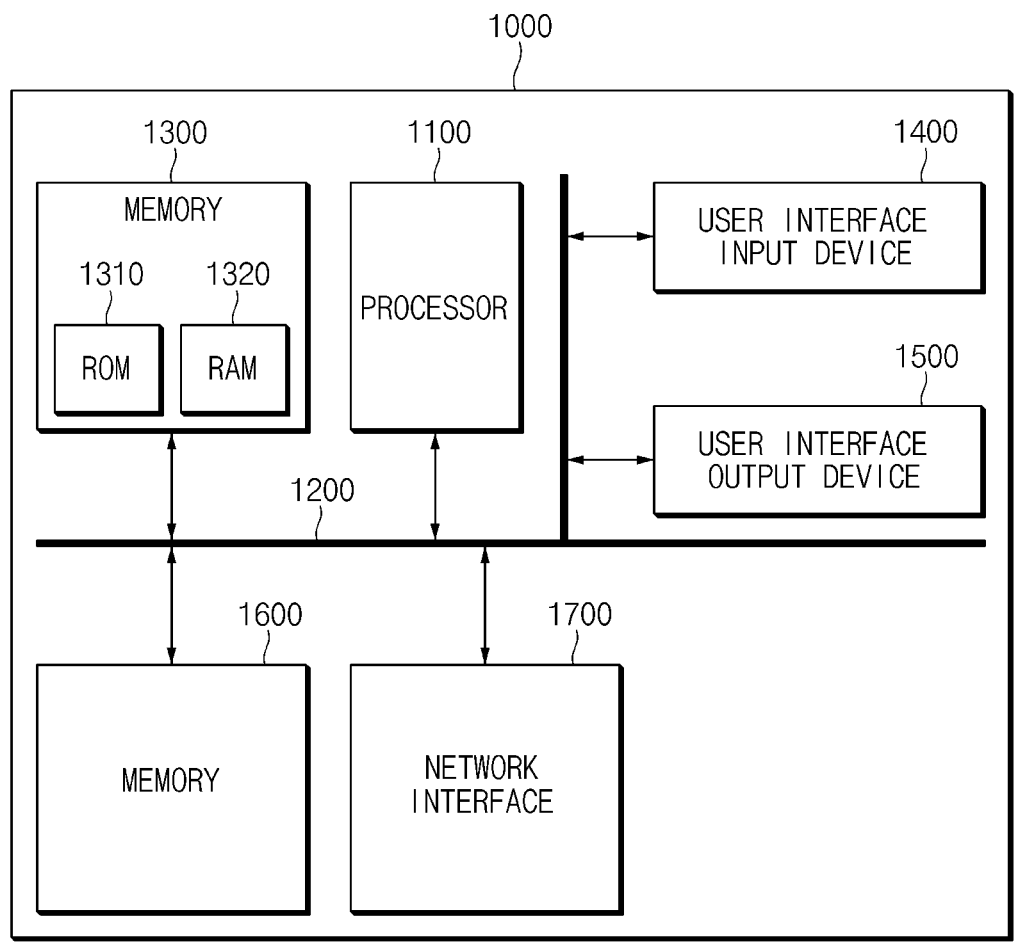
FIG. 9 is a block diagram illustrating a computing system for executing a method of providing DSSAD data according to an embodiment of the present disclosure.

FIG. 9 is a block diagram illustrating a computing system for executing a method of providing DSSAD data according to an embodiment of the present disclosure.

Referring to FIG. 9, the method of providing DSSAD data according to each embodiment of the present disclosure described above may be implemented through a computing system. A computing system woo may include at least one processor 1100, a memory 1300, a user interface input device 1400, a user interface output device 1500, a memory (i.e., a storage) 1600, and a network interface 1700 connected through a bus 1200.

The processor 1100 may be a central processing unit (CPU) or a semiconductor device that processes instructions stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the memory 1600), such as a RAM, a flash memory, a ROM, an EPROM, an EEPROM, a register, a hard disk, a solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the system for providing DSSAD data and the method thereof of the embodiments, it is possible to authenticate a user by interworking with a head unit provided in a vehicle, verify the head unit based on a first secret key verification message, verify a user terminal based on a second secret key verification message, and transmit the DSSAD data to the user terminal when both the head unit and the user terminal are verified, thereby providing the DSSAD data to the user while maintaining the integrity and confidentiality of data.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A method of providing data storage system for autonomous driving (DSSAD) data, the method comprising:
    verifying, by an autonomous driving controller, a head unit based on a first secret key verification message;
    verifying, by the autonomous driving controller, a user terminal based on a second secret key verification message; and
    transmitting, by the autonomous driving controller, the DSSAD data to the user terminal when both the head unit and the user terminal are verified.

2. The method of claim 1, wherein transmitting the DSSAD data to the user terminal comprises:
    converting, by the autonomous driving controller, the DSSAD data into an extensible markup language (XML) file; and
    encrypting, by the autonomous driving controller, the XML file.

3. The method of claim 1, wherein verifying the head unit comprises:
    initially verifying, by the autonomous driving controller, the head unit through a comparison between a first message authentication code (MAC) received from the head unit and a second MAC generated by the autonomous driving controller; and
    finally verifying, by the autonomous driving controller, the head unit based on a verification result recorded in the first secret key verification message.

4. The method of claim 3, wherein initially verifying the head unit comprises:
    receiving, by the autonomous driving controller, the first secret key verification message from the head unit;
    calculating, by the autonomous driving controller, a hash value of the first secret key verification message;
    receiving, by the autonomous driving controller, a first secret key from the head unit;
    generating, by the autonomous driving controller, the second MAC by encrypting the hash value of the first secret key verification message with the first secret key; and
    receiving, by the autonomous driving controller, the first MAC from the head unit.

5. The method of claim 4, wherein receiving the first secret key from the head unit comprises:
    generating, by the autonomous driving controller, a public key and a private key based on elliptic curve cryptography;
    transmitting, by the autonomous driving controller, the public key to the head unit;
    receiving, by the autonomous driving controller, an encrypted first secret key from the head unit; and
    decrypting, by the autonomous driving controller, the encrypted first secret key with the private key.

6. The method of claim 4, wherein receiving the first MAC from the head unit comprises:
    generating, by the head unit, the first secret key;
    generating, by the head unit, the first secret key verification message;
    calculating, by the head unit, the hash value of the first secret key verification message;
    generating, by the head unit, the first MAC by encrypting the hash value of the first secret key verification message with the first secret key; and
    transmitting, by the head unit, the first MAC to the autonomous driving controller.

7. The method of claim 6, wherein generating the first secret key comprises:
    recognizing, by the head unit, a fingerprint of a user; and
    generating, by the head unit, the first secret key by using fingerprint data of the user.

8. The method of claim 4, wherein finally verifying the head unit comprises:
    determining, by the autonomous driving controller, that the head unit is normal when the verification result recorded in the first secret key verification message is 'Pass'; and
    determining, by the autonomous driving controller, that the head unit is abnormal when the verification result recorded in the first secret key verification message is 'Fail'.

9. The method of claim 8, wherein determining that the head unit is abnormal comprises:
    identifying, by the autonomous driving controller, whether the first secret key includes more than a preset number of consecutive zeros when the verification result recorded in the first secret key verification message is 'Fail';
    determining, by the autonomous driving controller, that the head unit is abnormal when the first secret key includes more than the preset number of consecutive zeros as an identifying result; and
    determining, by the autonomous driving controller, that the head unit is normal when the first secret key does not include more than the preset number of consecutive zeros as the identifying result.

10. The method of claim 1, wherein verifying the user terminal comprises:
    initially verifying, by the autonomous driving controller, the user terminal through a comparison between a first message authentication code (MAC) received from the user terminal and a second MAC generated by the autonomous driving controller; and
    finally verifying, by the autonomous driving controller, the user terminal based on a verification result recorded in the second secret key verification message.

11. The method of claim 10, wherein initially verifying the user terminal comprises:

receiving, by the autonomous driving controller, the second secret key verification message from the user terminal;

calculating, by the autonomous driving controller, a hash value of the second secret key verification message;

receiving, by the autonomous driving controller, a second secret key from the user terminal;

generating, by the autonomous driving controller, the second MAC by encrypting the hash value of the second secret key verification message with the second secret key; and receiving, by the autonomous driving controller, the first MAC from the user terminal.

12. The method of claim 11, wherein receiving the second secret key from the user terminal comprises:

generating, by the autonomous driving controller, a public key and a private key based on elliptic curve cryptography;

transmitting, by the autonomous driving controller, the public key to the user terminal;

receiving, by the autonomous driving controller, an encrypted second secret key from the user terminal; and decrypting, by the autonomous driving controller, the encrypted second secret key with the private key.

13. The method of claim 11, wherein receiving the first MAC from the user terminal comprises:

generating, by the user terminal, the second secret key;

generating, by the user terminal, the second secret key verification message;

calculating, by the user terminal, a hash value of the second secret key verification message;

generating, by the user terminal, the first MAC by encrypting the hash value of the second secret key verification message with the second secret key; and transmitting, by the user terminal, the first MAC to the autonomous driving controller.

14. The method of claim 11, wherein finally verifying the user terminal comprises:

determining, by the autonomous driving controller, that the user terminal is normal when the verification result recorded in the second secret key verification message is 'Pass'; and determining, by the autonomous driving controller, that the user terminal is abnormal when the verification result recorded in the second secret key verification message is 'Fail'.

15. The method of claim 14, wherein determining that the user terminal is abnormal comprises:

identifying, by the autonomous driving controller, whether the second secret key includes more than a preset number of consecutive zeros when the verification result recorded in the second secret key verification message is 'Fail';

determining, by the autonomous driving controller, that the user terminal is abnormal when the second secret key includes more than the preset number of consecutive zeros as an identifying result; and determining, by the autonomous driving controller, that the user terminal is normal when the second secret key does not include more than the preset number of consecutive zeros as the identifying result.

16. A system for providing data storage system for autonomous driving (DSSAD) data, the system comprising:

a head unit configured to generate a first secret key verification message;

a user terminal configured to generate a second secret key verification message; and an autonomous driving controller configured to verify the head unit based on the first secret key verification message, verify the user terminal based on the second secret key verification message, and transmit the DSSAD data to the user terminal when the head unit and the user terminal are verified.

17. The system of claim 16, wherein the autonomous driving controller is configured to convert the DSSAD data into an extensible markup language (XML) file, encrypt the XML file, and transmit the encrypted XML file to the user terminal.

18. The system of claim 16, wherein the autonomous driving controller is configured to:

initially verify the head unit through a comparison between a first message authentication code (MAC) received from the head unit and a first MAC generated by the autonomous driving controller;

finally verify the head unit based on a first verification result recorded in the first secret key verification message;

initially verify the user terminal through a comparison between a second MAC received from the user terminal and a second MAC generated by the autonomous driving controller; and finally verify the user terminal based on a second verification result recorded in the second secret key verification message.

19. The system of claim 18, wherein the autonomous driving controller is configured to:

determine that the head unit is normal when the first verification result recorded in the first secret key verification message is 'Pass';

determine that the head unit is abnormal when the first verification result recorded in the first secret key verification message is 'Fail';

determine that the user terminal is normal when the second verification result recorded in the second secret key verification message is 'Pass'; and determine that the user terminal is abnormal when the second verification result recorded in the second secret key verification message is 'Fail'.

20. The system of claim 19, wherein the autonomous driving controller is configured to:

determine that the head unit is abnormal when the first verification result recorded in the first secret key verification message is 'Fail' and a first secret key received from the head unit includes more than a preset number of consecutive zeros;

determine that the head unit is normal when the first secret key does not include more than the preset number of consecutive zeros;

determine that the user terminal is abnormal when the second verification result recorded in the second secret key verification message is 'Fail' and a second secret key received from the user terminal includes more than the preset number of consecutive zeros; and determine that the user terminal is normal when the second secret key does not include more than the preset number of consecutive zeros.

* * * * *